July 30, 1974        J. J. FIORELLA        3,826,855

CITRUS FRUIT PEELS FOR ALCOHOLIC BEVERAGES

Filed March 27, 1972

United States Patent Office 3,826,855
Patented July 30, 1974

3,826,855
CITRUS FRUIT PEELS FOR ALCOHOLIC BEVERAGES
John J. Fiorella, 181 Richmond Ave., Buffalo, N.Y. 14222
Filed Mar. 27, 1972, Ser. No. 238,277
Int. Cl. A23l 1/12
U.S. Cl. 426—175      5 Claims

ABSTRACT OF THE DISCLOSURE

Citrus fruit peels, such as lemon or lime peels, for use in flavoring alcoholic beverages, such as cocktails, are in strip form, with the face of the citrus peel being coated with a protective material to insure its freshness and with the peel being cut or slit on the sides, ends or in a middle portion to improve its flavoring ability when it is twisted and added to an alcoholic beverage. Also disclosed are methods of making such peels and of using them. Packages of the peels are also described wherein inert gases and a suitable low temperature are employed to preserve the citrus flavor which is released upon twisting the peels.

---

This invention relates to citrus fruit peels used for flavoring alcoholic beverages. More particularly, it relates to such peels, e.g., lemon or lime peels, for use in flavoring cocktails, which peels are in strip form, having the face thereof coated with a protective material to insure the freshness of the peel and having a side or end of the peel of increased surface area to promote ready transfer of the peel flavor to the alcoholic beverage. The invention also relates to packages of peels held at a suitable low temperature and to methods of making the peels and of using them.

The use of citrus fruit peels for flavoring alcoholic beverages is well known. Perhaps the most widely used peels are those of lemons, which are most frequently employed to flavor Martini cocktails. Other citrus peels, including lime and orange peels and in some cases, grapefruit peels, are used for flavoring cocktails, highballs and other mixed drinks and to give them a colorful or decorative appearance. Although it is not required in all drinks, often before a peel is added to an alcoholic beverage the bartender or host twists it to break some of the cells near the surface of the peel and to release the citrus oil and flavor from them. It is particularly the preparation of a more flavorful peel or "twist" of peel, preferably of truer flavor, to which this invention is directed.

In accordance with the present invention, a citrus fruit peel for use in flavoring alcoholic beverages comprises a strip of citrus peel coated on its face with a protective material to insure its freshness and being cut to increase the surface area of a side or end portion thereof over that of a rectangular strip of similar face area, to improve the flavoring ability of the citrus peel in use in an alcoholic beverage. The invention also relates to methods of making, packaging and using such peels and packages of the peels.

The citrus fruits that are employed to flavor alcoholic beverages include lemons, limes, oranges and more rarely, grapefruits. The peels of such fruits are usually from 0.2 to 0.6 cm. thick, including sections of pulp which normally adhere to the outer portion of the peel. The outer portion of the peels may be from 0.1 to 0.3 cm. thick. It includes cells which contain characteristic fruit oils and flavors and which upon rupturing, as a peel strip is twisted, release such material. Thus, to obtain the fruity aroma and to impart the flavoring of the peel to the alcoholic beverage, it is common to twist or otherwise bruise the peel shortly before it is immersed in the alcoholic beverage.

In addition to the transmission of flavor or flow thereof through the face or outer portion of the peel, upon rupturing of the oil or flavor cells it is known that some flavoring also travels through a network of channels to the side of the peel (side in this context includes end and even intermediate portions of the peel strip, if these have been perforated or slit). Although it has for long been the custom to cut peels for alcoholic beverage twists along straight lines, so that the peels are essentially rectangular strips, it has now been discovered that improved flavoring is obtained when the sides or ends are cut so as not to be straight walled but rather to have points, indentations, sawtooth effects or jagged edges. It is noted that the flavoring from such peels is stronger than from the conventionally cut peels and the aroma is also more noticeable and often more pleasant. In addition, the peels are more attractive.

Because most of the flavor cells are located near the "outer" surface of the fruit, it is desirable that such surface should be made capable of transmitting the flavor essences and oils through openings therein. Thus, if the surface became hardened, the flavoring effect of the twisted peel would be diminished. Accordingly, coating materials are applied to such surfaces, in accordance with the present invention, to maintain them pliable and capable of transmitting flavor essences. Sometimes, in addition to the danger of drying out in storage, one finds that citrus fruit peels have coatings of wax or other materials on the outer surfaces thereof which themselves act as barriers, preventing the citrus peel twist from being as flavorful as would be the case were the wax not there. It is preferred to remove this wax, usually by quick solvent treatment, sometimes with ethanol at and other times with ordinary commercial solvents, such as mild tasting halogenated hydrocarbon propellants, e.g., Freons 11 and 21. Even if such waxes or other barriers are not removed, the application of a preferred coating agent, glycerol, acts to plasticize the waxes and facilitates flavor transmissions through the peel faces. Instead of glycerol, other polyhydric alcohols, e.g., 70% aqueous solutions of sorbitol; vegetable gums, e.g., carob bean gum; synthetic gums and thickeners, e.g., sodium carboxymethyl cellulose; and starches may be employed. Generally it is preferred to utilize a coating agent which will be soluble in the alcoholic beverage and improves peel appearance, e.g., glycerol.

To obtain the best fracturings of the cells of the peels, it is preferable that peels be held at a low temperature, yet above freezing. Sometimes this temperature can be as low as −10° C. but it is preferred that it be within the range of 2 to 10° C., more preferably, from 2 to 6° C. At such temperatures, the cell walls become more brittle and more readily capable of being effectively ruptured by twisting.

The invention will be readily understood from this description, taken in conjunction with the drawing in which.

Figure 1:
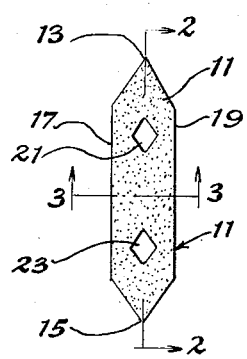
FIG. 1 is a top plan view of a peel of this invention having pointed ends and a pair of diamond shaped perforations.
Figure 2:
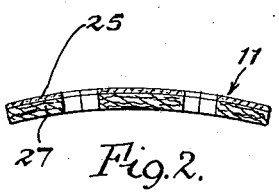
FIG. 2 is a central longitudinal sectional view of a peel of FIG. 1 along plane 2—2 of FIG. 1.
Figure 3:
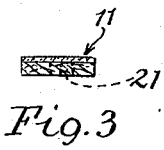
FIG. 3 is a sectional view along plane 3—3 of FIG. 1.

In FIG. 1 citrus peel 11 has pointed ends 13 and 15 and straight sides 17 and 19. It is also internally perforated with diamonds 21 and 23. In FIG. 2 face 25, containing the flavor cells, covers pulpy section 27. Such parts of the peel also show in FIG. 3.

Figure 4:
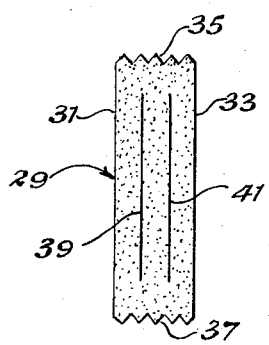
FIG. 4 is a top plan view of another embodiment of the invention with the peel having sawtoothed ends and a pair of longitudinal slits therein.
Figure 5:
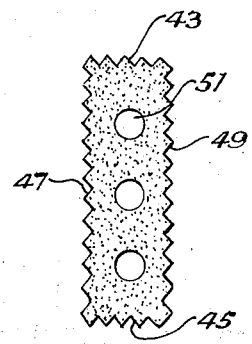
FIG. 5 is a top plan view of another embodiment of the invention having sawtoothed sides and ends and circular perforations.

Citrus peel 29 of FIG. 4 contains straight sides 31 and 33, sawtoothed ends 35 and 37 and slits 39 and 41. In FIG. 5, ends 43 and 45 are sawtoothed, as are sides 47 and 49. Also, three internal circular perforations 51 are illustrated.

Figure 6:
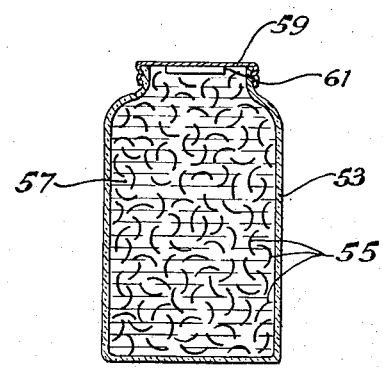
FIG. 6 is a central vertical sectional view of a container of pre-cut peels.

In FIG. 6 is shown a glass or plastic bottle or jar 53, containing lemon peels 55 in a nitrogen atmosphere 57. Jar cap 59 seals the container and maintains it under a pressure of 0.2 to 1 lb./sq. in. A desiccant envelope 61, containing silica gel, is affixed to the cap interior and the container of peels is stored at a temperature of −10 to +10° C., preferably at 2 to 6° C.

The citrus peel will normally be of a width from 0.6 cm. to 1.5 cm., preferably from 0.8 cm. to 1.2 cm. It will be longer than wide and usually the length:width ratio will be from 3:1 to 10:1. The protective coating, preferably of glycerol, on the face of the peel will be sufficiently thin so as not to interfere with the transmission of flavor through the face of a peel to an alcoholic beverage after the peel has been twisted and placed in such beverage. With glycerol and other coating agents, the amount deposited on the face will usually be from 0.002 to 0.03 gram per square centimeter of surface area of the face of the peel and the coating will be from 0.001 to 0.05 cm. thick. Although other portions of the peel may be coated with glycerol or a coating agent, it is usually not necessary to do so because they do not tend to dry out the way the face of the peel does if uncoated and do not contain waxy coatings which are plasticized by the glycerol or other coating agent or emollient. Thus, the other surfaces of the peel may be free of glycerol coating. Additionally, the face of the peel can be free of materials other than the glycerol or such coating, and such are often preferred. However, if desired, flavoring agents, colorants, antioxidants, stabilizers, etc., may be mixed in with the glycerol or coating agent or the peel may be soaked in them for additional flavoring and appearance effects. For example, lemon oil may be mixed with the coating agent, usually in a weight ratio of 0.1 to 0.5.

When the peel is slit or perforated internally it will normally be desired to have the minimum width of the peel be greater than .03 cm. Otherwise, when the peel is twisted, it may tend to break at a weak spot, which is undesirable.

To make the citrus fruit peels of improved flavoring properties it is usually desirable to coat a whole citrus fruit with the protective material and then cut the peel from the fruit in strips, with the sides, end or middle portions pointed, sawtooth, jagged, perforated, slit or otherwise modified to increase the side area and facilitate transmission of the flavoring from the peel to the alcoholic beverage after twisting of the peel. It is preferred to cut the peel while it is still on the fruit, rather than to peel the fruit and then cut the removed peel to shape. Thus, when making a sawtoothed peel, such as that of FIG. 5, a knife or roller is utilized with a cutting edge which produces the sawtoothed effect repeatedly, and the peel is removed and cut to lengths. Such cutting may be effected when the fruit is cold, in the 2 to 10° C. range, at which temperatures better cuts may be obtained. If the peels are not initially at a low temperature, they are cooled to a temperature in the range of −10 to +10° C., preferably 2 to 10° C., before use. Also, they may be stored or refrigerated at such temperature, preferably in a container or plastic bag with other such peels awaiting use. If moisture tends to condense in such a bag, a desiccant may be employed to prevent undesirable condensation.

To help further to preserve the cut peels, when stored they may be kept under a nitrogen or other inert gas atmosphere, preferably utilizing a gas with a molecular weight less than that of air. Such a gas will tend to escape from the pores of the peel in alcoholic beverages and will thereby aid in forcing the flavor or citrus oil into the beverage. Although low molecular weight inert gases are preferred, it is also possible to employ carbon dioxide for this purpose. Preferably, the container in which the peels and gas are present will be under pressure, e.g., 0.2 to 1 p.s.i., and the gas will be substantially oxygen-free. Instead of an inert gas one that is substantially inert may also be employed but it is still preferred that it be free of oxygen or that the oxygen content be no greater than 3% by volume.

A preferred form of packaging is in plastic bags 1 to 3 mils thick and hermetically sealed or tied at the tops thereof. Often, each such bag will contain from 10 to 100 peels and a plurality of such sealed bags may be packed in a moisture-tight container, such as a polyethylene jar of appropriate size. Thus, the packages of peels may be removed from the jar as required by each bartender and, if desired, he may replace each such package in the refrigerator between uses or may keep it cooled at the bar in the water-tight package immersed in cold water or adjacent an ice cube. A desiccant package or envelope may be kept adjacent the peels in each individual package and additional desiccants may be provided for the jar or container of a plurality of packages. These are especially advantageous under humid conditions and help to prevent condensation of moisture on the cooled peel. In some cases, a preservative, bactericide or fungicide may be present in or with the desiccant to assist in preventing deterioration of the peel or any development of a softness or sliminess in it on storage awaiting use.

To use the citrus fruit peels of this invention is a simple matter. It is only necessary to remove one of the peels from the refrigerated package, twist it and drop it into the alcoholic beverage. The peels keep for long periods of time, at least a month, under refrigeration, especially if an antioxidant is included in the coating agent and the peels are kept under constant refrigeration at 2 to 6° C. After twisting, the flavor of the peel is discharged through the face and sides into the alcoholic beverage. The low temperature aids in fracturing the oil and flavor cells of the peel and helps the flavor essences to flow into the beverage. Also, the peel helps to maintain the beverage cold, because of its own low temperature.

The advantages of the present invention are numerous. First of all, the product made is more attractive than the oridinary twist cut by a bartender from a citrus fruit when an alcoholic beverage is ordered. The twists are more flavorful and when they are at the low temperature mentioned a drink is not warmed by their use. Because they are pre-cut to size the strips do not have weak spots such as are often the results of hand peeling by a bartender, that would cause them to break apart when being twisted. They are sanitary and because they are long-lasting, a large supply may be kept on hand so that the bar would not run out of peels even when there is a greater than usual demand for beverages in which they are employed.

Because the citrus fruits are pre-peeled, there is no waste of the fruit itself, unlike in the case of the small bar, where the fruit may have to be discarded after peels are removed from it. Then too, the unattractive appearance of a previously partially stripped lemon or lime from which the bartender is removing a twist would not be encountered by the customer. Of course, the use of the pre-cut peels is time-saving for the bartender, which is of great importance in the case of busy bars.

In summary, the present invention provides better, more santiary, more attractive, more flavorful, more convenient products and methods for the preparation of alcoholic beverages requiring citrus fruit peels, compared with prior art methods and those presently in use.

The following example illustrates the invention but does not limit it. Unless otherwise indicated, all temperatures are in ° C., all measurements are in the metric system and all parts are by weight.

EXAMPLE

The skins of ten large lemons are brushed with a protective coating of glycerol at an application rate of about 0.008 g./sq. cm. and a coating thickness of about 0.01 cm. The skins are then cut to the shape illustrated in FIGS. 1–3 and the peels are removed in such shape from the lemon, with the remaining portion of the lemon being utilized for juice and flavorings. Each strip of peel has a width of about 0.9 cm. and a length of about 5 cm., with a slight taper to compensate for the original shape of the lemon. About fourteen peels are obtained from each lemon. One hundred of these are allowed to air dry for a short time, usually about five minutes at the most, and are then packed with small desiccant envelopes of silica gel into polyethylene bags of appropriate size to tightly cover the peels, twenty to each bag. The packing is under a nitrogen atmosphere, although in other cases vacuum packing is employed, also under a nitrogen atmosphere.

After preparation of bags of lemon peels, they are immediately refrigerated, being held at a temperature of about 4° C. for three days, in the two mil polyethylene plastic containers, tightly packed inside a thick polyethylene jar which is maintained air tight. After that time, the lemon peels are removed for use at the bar and are found to be as good as or better than freshly peeled lemons. They are easier to employ, more sanitary and appear to be more flavorful.

When, in variations of this experiment, the peel designs employed are those of FIGS. 4 and 5, similar results are obtained but the lemons are even stronger flavored. When individual peels are cut from the lemons into the shapes described and are subsequently treated with glycerol on the outer surfaces thereof, the equivalent end use results are obtained providing that the cuts are the same. Also, when a plurality of envelopes of 20, 50 or 100 or the desired number of lemon peels each, is packed into a jar like that of FIG. 6, more convenient dispensing and improved sanitary operations are obtained.

Of course, in variations of the experiment other citrus fruits are employed, e.g., limes, oranges and grapefruits. They are also storable for similar comparatively long periods of time by the present methods and produce excellent flavored products which do not dry out, become rancid, poor in flavor or soft in use.

The invention has been described with respect to illustrations and specific exemplifications thereof but is not to be limited to them because it is evident that one of ordinary skill in the art will be able to utilize equivalents and substitutes for elements of the invention without departing from the spirit thereof.

What is claimed is:

1. An alcoholic beverage containing a flavoring citrus fruit peel which comprises a strip of citrus fruit peel coated on its external face with a protective material to insure its freshness, said material being selected from the group consisting of glycerol, sorbitol, vegetable gums, synthetic gums and starches, said peel having an edge portion thereof cut in a sawtooth configuration and having an interior portion thereof cut, to increase the edge surface area of the peel to improve the flavoring effect thereof in the alcoholic beverage.

2. An alcoholic beverage according to claim 1 wherein the strip of citrus peel is substantially rectangular in shape and the ends thereof are cut in sawtooth configuration.

3. An alcoholic beverage according to claim 2 wherein the sides of the rectangular strip are cut in sawtooth configuration.

4. An alcoholic beverage according to claim 3 wherein the interior cut is circular in shape.

5. An alcoholic beverage according to claim 1 wherein the protective material is glycerol.

References Cited

UNITED STATES PATENTS

| | | | |
|---|---|---|---|
| 1,853,151 | 4/1932 | Segur et al. | 99—168 X |
| 2,611,708 | 9/1952 | Owens et al. | 99—168 X |
| 2,748,003 | 5/1956 | Straub | 99—102 |
| 2,976,159 | 3/1961 | Swisher | 99—204 |
| 3,006,773 | 10/1961 | Fitzgerald | 99—103 X |
| 3,008,838 | 11/1961 | Brunsing et al. | 99—154 X |
| 3,368,909 | 2/1968 | Moore et al. | 99—103 X |
| 3,516,836 | 6/1970 | Shea | 99—168 X |

FOREIGN PATENTS

| | | | |
|---|---|---|---|
| 153,174 | 9/1953 | Australia | 99—168 |

NORMAN YUDKOFF, Primary Examiner

U.S. Cl. X.R.

426—308, 386, 431, 512, 190